United States Patent

Murgia, Jr. et al.

[11] Patent Number: 5,676,335
[45] Date of Patent: Oct. 14, 1997

[54] AIRFLOW CONTROL SYSTEM FOR A HELICOPTER

[75] Inventors: Edward C. Murgia, Jr., Chandler; Thomas M. Andrews, Apache Junction, both of Ariz.

[73] Assignee: McDonnell Douglas Helicopter Company, Mesa, Ariz.

[21] Appl. No.: 402,997

[22] Filed: Mar. 8, 1995

[51] Int. Cl.$^6$ .............................. B64C 27/82; B64B 1/36
[52] U.S. Cl. ................................ 244/17.19; 244/52
[58] Field of Search ........................ 244/51, 52, 73 C, 244/17.19, 207, 208, 130, 12.5

[56] References Cited

U.S. PATENT DOCUMENTS

| | | | |
|---|---|---|---|
| 4,200,252 | 4/1980 | Logan et al. | 244/17.19 |
| 4,948,068 | 8/1990 | Van Horn | 244/17.19 |
| 5,205,512 | 4/1993 | Rumberger | 244/52 |
| 5,232,183 | 8/1993 | Rumberger | 244/52 |

FOREIGN PATENT DOCUMENTS

| | | | |
|---|---|---|---|
| 2238995 | 6/1991 | United Kingdom | 244/17.19 |
| 2238996 | 6/1991 | United Kingdom | 244/17.19 |

*Primary Examiner*—Andres Kashnikow
*Assistant Examiner*—Virna L. Mojica
*Attorney, Agent, or Firm*—Donald E. Stout

[57] ABSTRACT

A system is disclosed for controlling the external flow passing along the external surface of an aircraft such as the tailboom of a helicopter. A fan blows air into a cavity within a surface, and the air exits the surface through one or more axially oriented slots. A ramp structure is positioned within the cavity and upstream of each slot, and a set of fence structures are mounted in each slot and spaced from each other as well as from the ramp structure. The ramp and fence structures trip the airflow which then couples to the downstream side of the ramp and fence structures, thus eliminating the axial airflow component adjacent to the slot, and exits the slot in a direction normal to the axis. The airflow exits the slot in a direction tangential to the external surface and generally parallel with the external flow, resulting in deflection of the external flow and generating lift which is used to augment antitorque control in the helicopter implementation described.

18 Claims, 4 Drawing Sheets

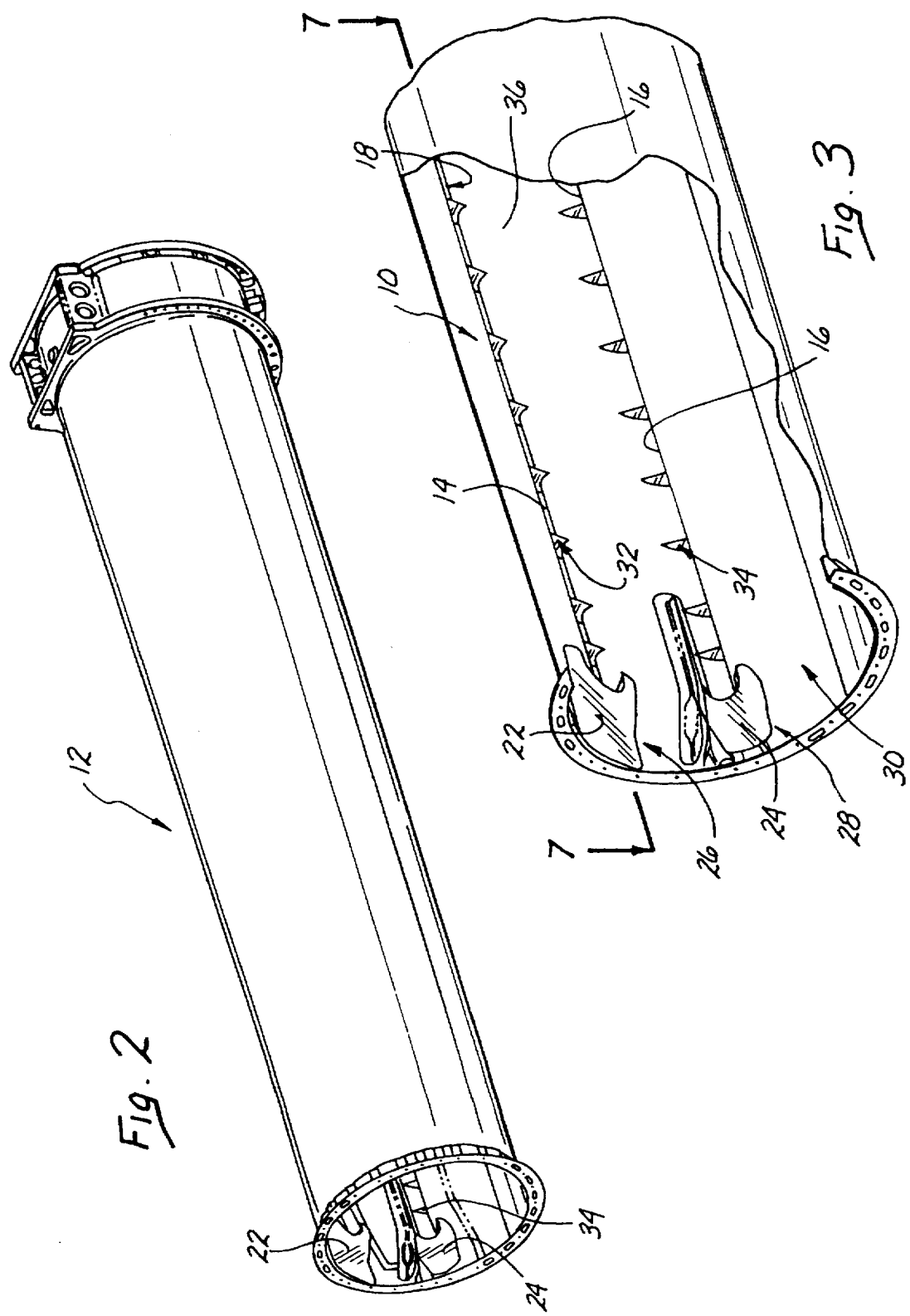

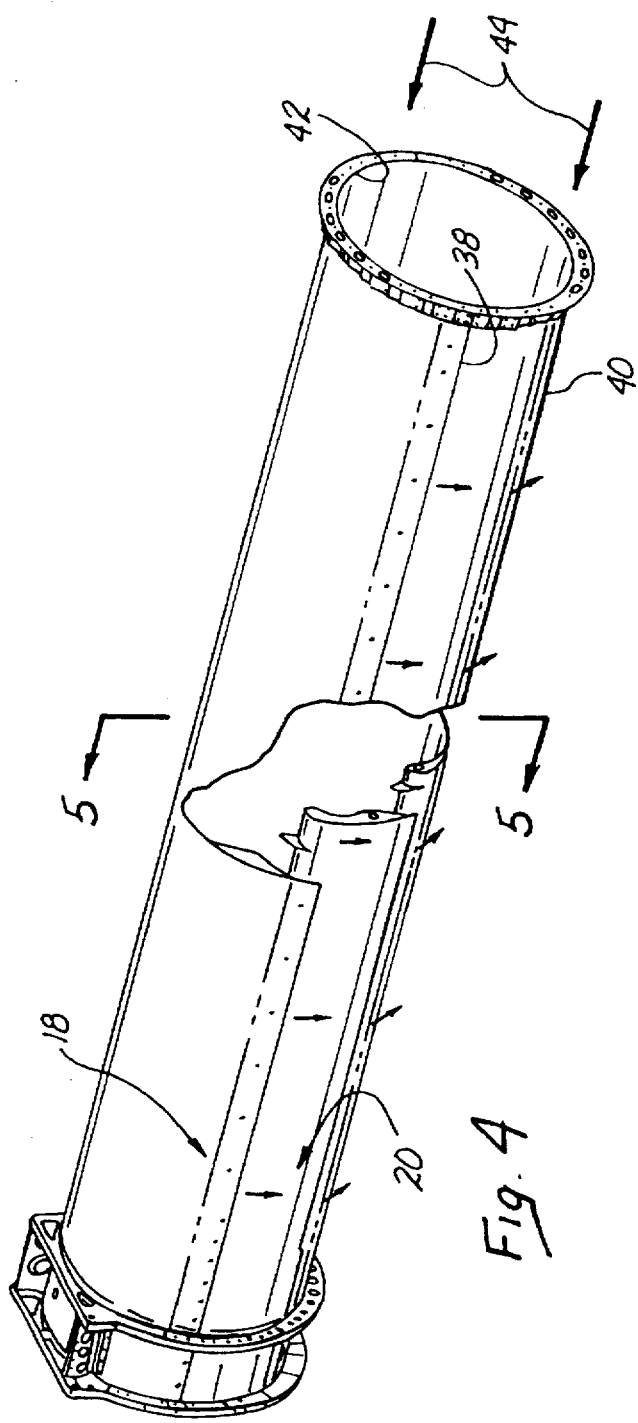
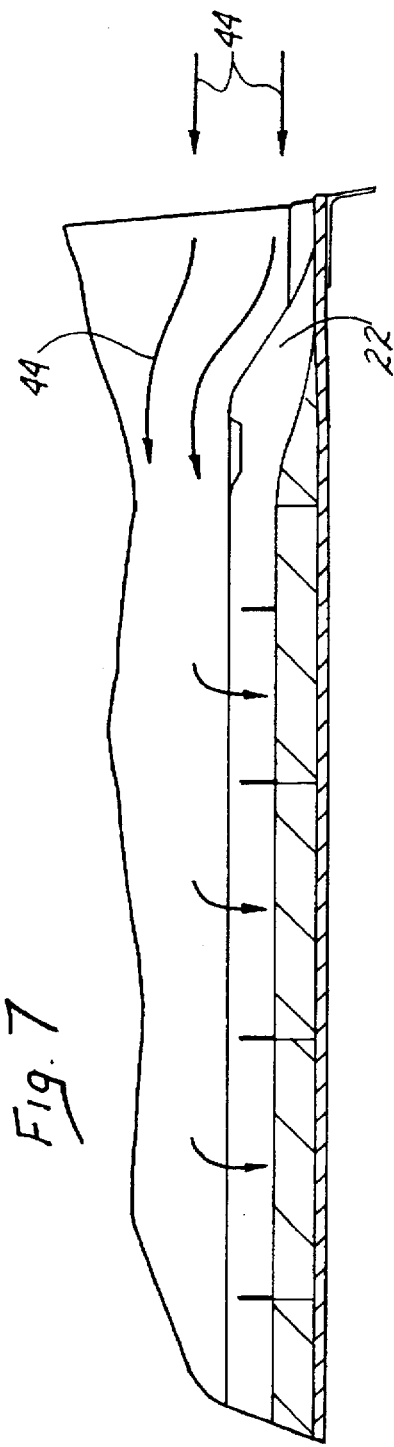

AIRFLOW CONTROL SYSTEM FOR A HELICOPTER

BACKGROUND OF THE INVENTION

The invention relates generally to systems for controlling the airflow discharged adjacent to an aircraft structure in order to adjust the force produced on that structure by the discharged airflow and resulting modification of the external flow field around the aircraft, and more particularly to systems for controlling the airflow adjacent to the external surface of the tailboom of a helicopter in order to increase and adjust the lateral force produced on the tailboom by the airflow and thereby provide a more efficient main rotor antitorque function without the necessity for a tail rotor.

A helicopter tail rotor produces a lateral force on the fuselage of the helicopter which counters the torque produced by operation of the main rotor. However, utilization of a tail rotor presents numerous disadvantages. The tail rotor presents a safety hazard, particularly to ground personnel, because it is relatively low and substantially invisible to ground personnel when rotating. Accidental tail rotor strikes against personnel and other objects are relatively frequent and often fatal. In addition, the right-angle gear boxes, bearings and high rotational speed shafting required for tail rotor operation present a complex system with attendant reliability and maintainability disadvantages. Moreover, since the tail rotor of a military helicopter is exposed and vulnerable to enemy fire during combat operations, it is susceptible to being disabled during such operations. Sudden disablement of the tail rotor can cause sudden and complete loss of antitorque function and yaw control, causing the helicopter to crash. Still another disadvantage of conventional tail rotors is their relatively noisy operation. Consequently, a helicopter antitorque system which does not require a tail rotor presents very important advantages over conventional tail rotor antitorque systems.

Various antitorque systems have been designed which obviate the need for a tail rotor. Some of these systems utilize slots or other types of apertures in the helicopter tailboom. The air discharged through the slots or apertures deflects the air passing over the tailboom, thereby producing an outwardly directed lateral force on that side of the tailboom which counters the torque produced by main rotor operation. One such effective and operational system is disclosed in U.S. Pat. No. 4,200,252 to Logan et al., commonly owned by the assignee of the present application and expressly incorporated herein by reference. The Logan system employs a fan within a helicopter tailboom which directs a stream of air rearwardly through the tailboom for discharge through slots longitudinally extending along a portion of the tailboom. A continuous sheet of air discharged tangentially through the slots deflects the main rotor downwash as it flows downwardly along the external surface of the tailboom. The deflection of the downwash produces a lateral force (or lift) on the tailboom (an effect termed "circulation control") and counters the torque acting on the tailboom and produced by operation of the main rotor. Thrust apertures positioned on the lateral sides of the tailboom aft of the slots also allow discharge of air therethrough and are utilized to vary the antitorque moment for trim and maneuvering.

While the antitorque system disclosed by Logan is considered highly effective, the air flowing aft through the tailboom tends to exit from the slot having a significant aft discharge angle, rather than generally normal to the tailboom longitudinal axis. This aft discharge angle tends to reduce the operational efficiency by reducing lateral boom lift.

What is needed, therefore, is an airflow control system which will enable the discharge of air through the slots of a circulation control surface like the tailboom of the antitorque system disclosed in the Logan patent in a direction substantially normal to the tailboom longitudinal axis (and parallel to the direction of the main rotor downwash). However, this airflow control system should not significantly diminish the airflow velocity through the slots, to avoid compromising the lateral force (lift) produced by the system.

SUMMARY OF THE INVENTION

The system of the present invention significantly improves the function of a circulation control surface of the type described above in that it substantially eliminates any axial flow component in the air discharged through the slots, thereby significantly increasing operational efficiency by enhancing lift (and thus antitorque control in a system like that disclosed in U.S. Pat. No. 4,200,252 to Logan).

The components of the fluid or air flow control system of the present invention include a main body (or tailboom) having a forward end, an aft end, an axis, and an exterior surface enclosing a cavity. One or more slots are positioned on the exterior surface of the main body, and are oriented generally axially. The main body cavity is adapted to receive fluid flowing in an aft direction through the forward end thereof. By allowing fluid flow egress from the body, the slot or slots enable the exiting fluid flow to enter the area of a fluid stream (typically main rotor downwash) passing adjacent to the main body exterior surface, thereby increasing the laterally directed force (or lift) acting on the main body.

Since it is desirable that the fluid flow direction exiting the slots be in the same plane as the direction of the force produced by the downwash in combination with the fluid flow and the direction of the downwash in order to more effectively increase the force produced, the fluid flow control system utilizes ramp and fence components to deflect and direct the fluid flow in the main body so that it exits the slots in the desired direction. One ramp is located forwardly of each slot within the cavity for deflecting the fluid flow inwardly toward the axis and away from the forward end of the slot. At least one fence is located in each slot, which is adapted to cause the fluid to exit the cavity through the slot in a direction generally normal to the axis of the body.

Consequently, the resultant effect of the ramp and fence structures is to eliminate the dynamic pressure force acting adjacent to the slots within the cavity so that the fluid flow exits the slots due to the static pressure differential between the cavity interior and exterior. This pressure differential causes the direction of the fluid flow exiting the slots to be approximately normal to the axis of the main body; i.e. the direction of the fluid flow has no appreciable axial component. The fluid flow control system thus produces a sheet of fluid which is moving in approximately the same direction as the external flow (rotor downwash in the Logan patent) so that it more effectively deflects the external flow laterally or outwardly from the main body, thereby increasing the force (or lift) produced thereon. Thus, the airflow control system of the present invention is more effective in increasing the force produced on the aircraft main body and is more energy efficient in providing fluid flow control.

In another aspect of the invention, a helicopter antitorque control system is provided which comprises a fuselage tailboom having a forward end, an aft end, an axis, and an exterior surface enclosing a cavity. A main rotor is mounted above the tailboom, and is adapted to rotate about an axis generally normal to the tailboom axis, the downwash from the rotating rotor flowing about the tailboom exterior surface. A fan is located in a forward portion of the tailboom for producing an axial airflow through the tailboom cavity in a fore to aft direction. One or more slots are located on the exterior surface of the tailboom and are oriented generally axially. The slots are adapted to permit air to exit from the cavity into the rotor downwash flowing about the tailboom exterior surface. At least one fence is located in the slot and is adapted to cause the fluid to exit the cavity through the slot or slots in a direction generally normal to the axis. Forwardly of each slot is a ramp, which is designed to deflect the airflow inwardly toward the axis and away from the forward end of its corresponding slot.

The invention, together with additional features and advantages thereof, may best be understood by reference to the following description taken in conjunction with the accompanying illustrative drawing.

BRIEF DESCRIPTION OF THE DRAWINGS

FIG. 2 is a perspective view of the tailboom of a helicopter, in which has been installed an airflow control system constructed in accordance with the principles of the invention;

FIG. 3 is a partial, fragmentary enlarged view of a portion of the tailboom illustrated in FIG. 2, showing the particular components of the inventive airflow control system;

FIG. 4 is a perspective view similar to FIG. 2, in reverse orientation, with a portion of axial length of the tailboom broken away to illustrate the location of the slot component structures of the inventive airflow control system and further illustrating the airflow exiting the slot structures;

FIG. 7 is a longitudinal sectional view taken along the lines 7—7 of FIG. 3 of an inner surface portion of the tailboom of the helicopter.

DETAILED DESCRIPTION OF THE PREFERRED EMBODIMENT

Figure 1:
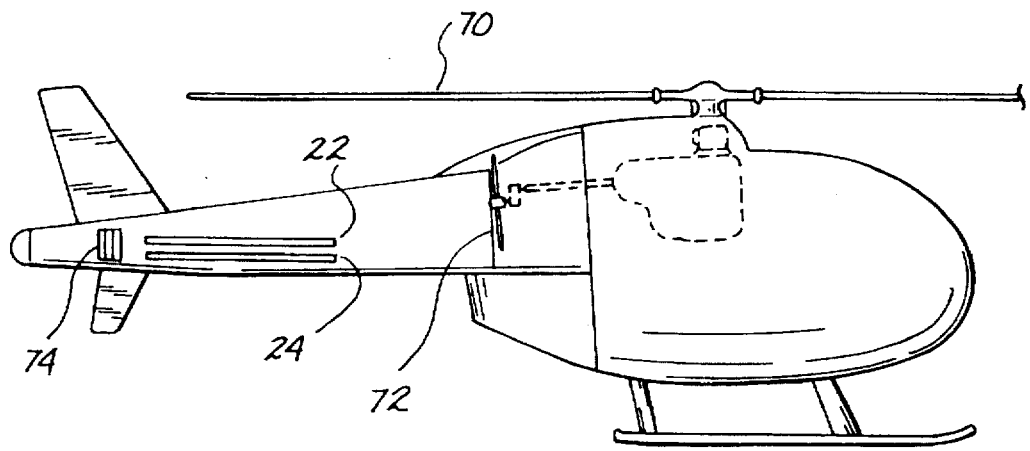
FIG. 1 is a diagrammatic view of a helicopter having the features of an embodiment of the present invention.
Figure 6:
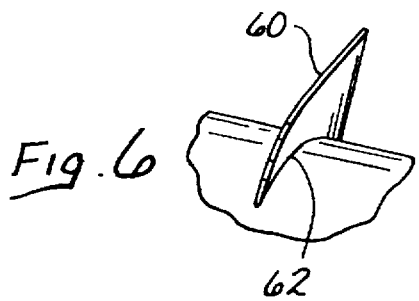
FIG. 6 is a perspective view of a fence component structure of the airflow control system of the present invention.

Referring now more particularly to FIGS. 1–5, the airflow control system of the present invention is generally designated by the numeral 10 and is shown installed within a helicopter tailboom 12. The airflow control system 10 preferably includes an upper slot 14 and a lower slot 16 positioned on the tailboom (or main body of a suitable aircraft structure) 12 at aft lateral medial and lateral lower (or underside) regions 18 and 20 (FIG. 4). The system 10 also includes an upper ramp 22 and a lower ramp 24 positioned in the tailboom 12 preferably at fore lateral medial and fore lateral lower (or underside) regions 26 and 28 (FIG. 3). Additionally, the system 10 includes an upper and lower set of fences 32 and 34 positioned in the upper and lower slots 14 and 16.

The tailboom 12 has a cavity 30 therein, and the slots 14 and 16, the ramps 22 and 24 and the fences 32 and 34 are preferably mounted within the cavity 30, as shown in FIG. 3. The ramps 22 and 24 are preferably mounted on an inner surface 36 of the tailboom at upper and lower forward ends 38 and 40 of the slots 14 and 16 (FIG. 4) and proximal to the portal 42 of the cavity 30. A main rotor 70 driven or motorized fan 72 (or other suitable means for providing an airflow) is located forward of the cavity 30 for providing and directing airflow 44 through the portal 42 and into the cavity 30 in a rearward or aft axial direction, as shown in FIGS. 4–7.

Figure 8:
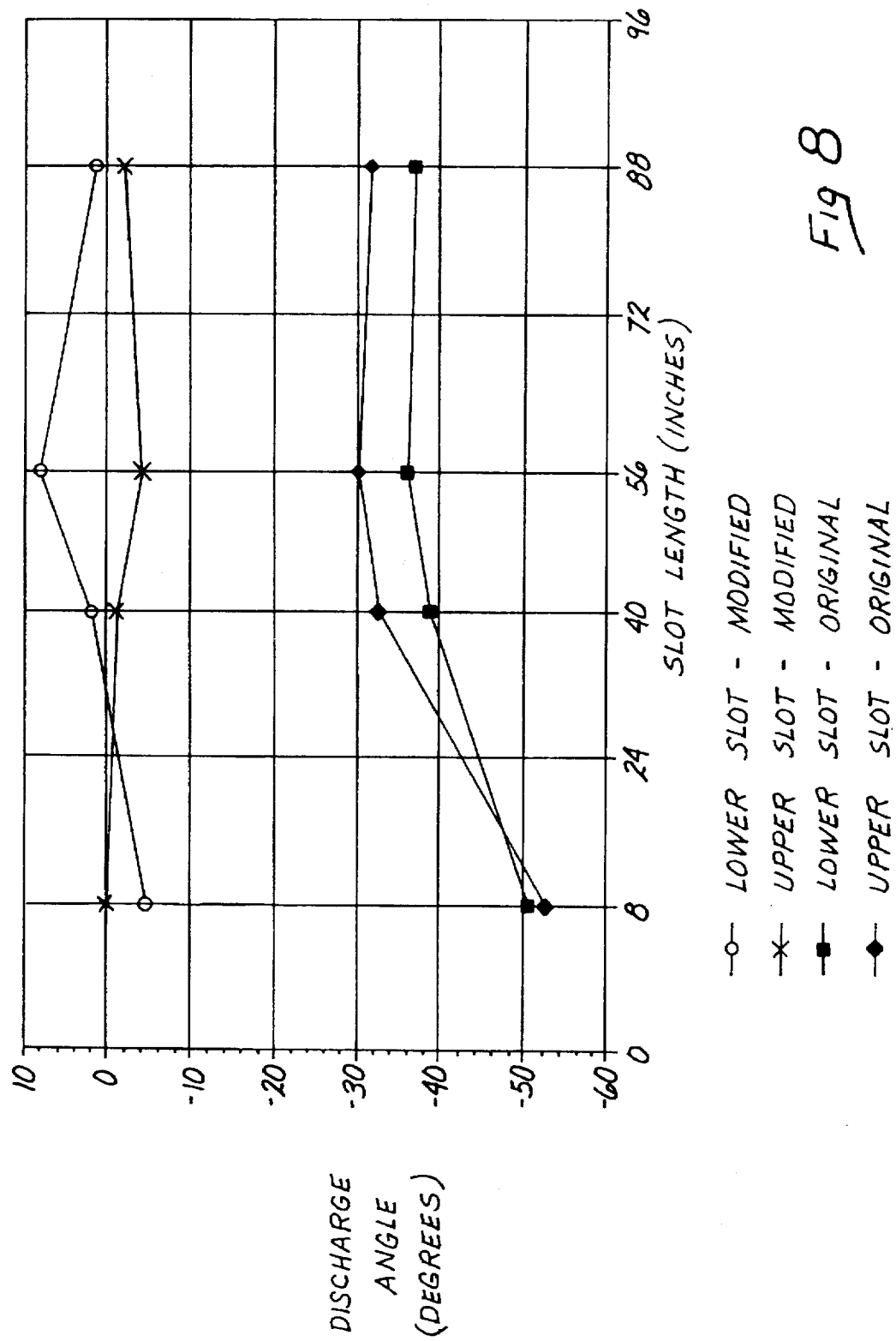
FIG. 8 is a graphical representation comparing the discharge angle (fore and aft relative to a plane normal to the tailboom axis) of the airflow exiting the slot component structures of the airflow control system of the present invention with the discharge angle of the airflow exiting the slot component structures of a similar prior art airflow control system which does not include the inventive ramp or fence component structures.

The airflow 44 directed into the cavity 30 by the fan is deflected by the ramps 22 and 24, as best seen in FIG. 7. The ramps 22 and 24 resemble "ski jumps" in that they divert the airflow along an inwardly sloping surface toward the axis 52 of the boom, and away from the slots 14 and 16. The sets of fences 32 and 34 which are positioned preferably approximately four inches aft or downstream from the ramps 22 and 24 are oriented so that they are generally normal to the axis 52 as well as to the direction of the airflow 44 directed into the cavity 30. In this regard, for the specific embodiment described and illustrated herein, the direction of the airflow 44 into the cavity 30 is parallel to the axis 52 of the tailboom; however, this may not be true if the airflow control system 10 is installed in other suitable types of aircraft structures. The orientation of the fences 32 and 34 in effect trips and blocks axial movement of the airflow 44 to thereby generally prevent the airflow 44 from moving in an axial direction along the slots 14 and 16. Instead, the axial dynamic pressure component at the wall of the cavity 30 is diminished so that the airflow 44 exits the slots 14 and 15 due to a pressure differential between the inside and outside of the cavity 30. The ramps and slots substantially eliminate axial components near the wall of the cavity in the airflow 44 adjacent to the exit slots without significantly reducing the dynamic pressure in the slot flow, thereby causing the airflow to exit the cavity 30 through the slots 14 and 16 in a direction generally normal to the axis 52 (or lying in the same plane as the direction of the main rotor downwash 54 (FIG. 5) and the direction of the desired lateral force produced). Consequently, the downwash 54, which also is moving generally normal to the axis 52 (when the helicopter is not moving horizontally at a high velocity), is deflected more effectively. FIG. 8 shows the angular direction (relative to a plane normal to the axis 52) of the airflow 44 exiting through the slots 14 and 16 of the system 10 in comparison to that of a similar system without the ramp or fence structures of the present invention; negative angles in FIG. 8 represent airflow in an aft direction, and positive angles represent airflow in a forward direction. The direction of movement of the airflow 44 exiting the tailboom 12 through the slots 14 and 16 enables the airflow 44 to provide enhanced deflection of the downwash, thereby increasing the lift produced and improving the helicopter control performance.

Jet thruster apertures 74 may also be included in the tailboom 12, aft of the slots 14 and 16, to provide additional antitorque generation and enhance maneuverability of the helicopter. Additionally, the slot outlet end portions 56 (FIG. 5) may be any suitable dimensional size in order to produce varying degrees of high or low velocity airflow discharge therefrom, as desired.

Figure 5:
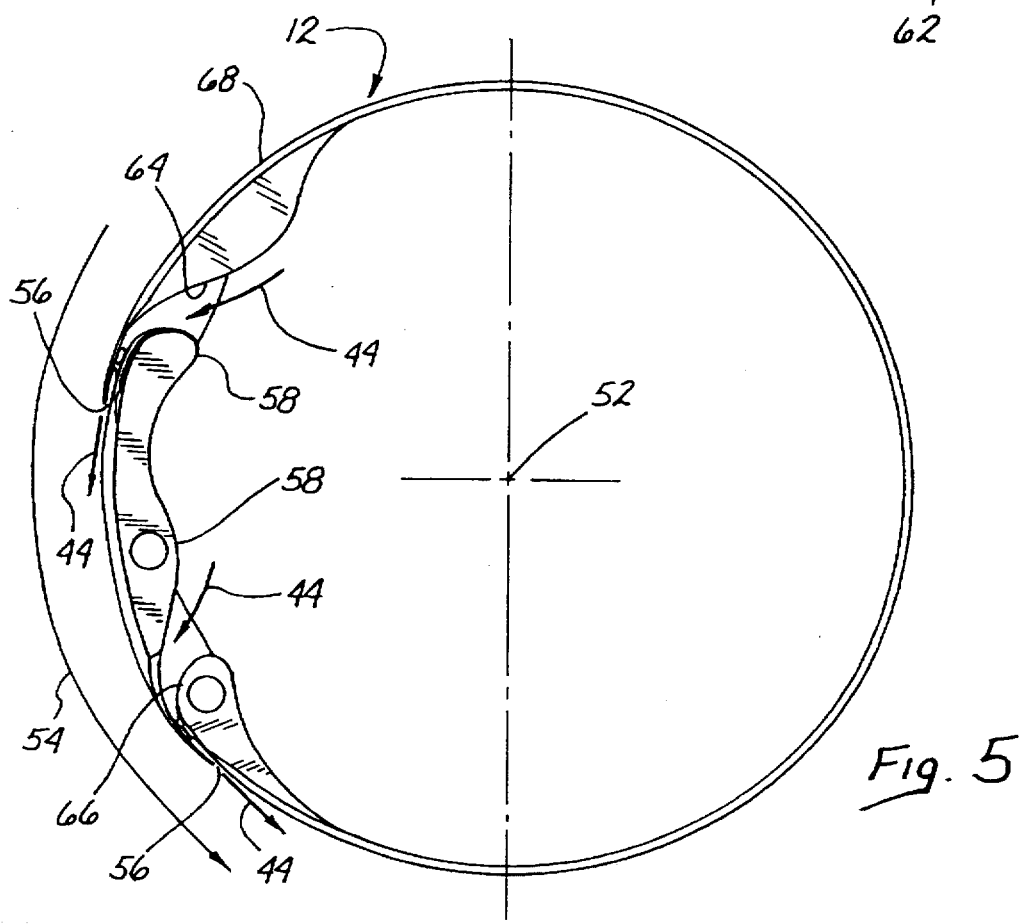
FIG. 5 is a partial radial section view through the tailboom, taken along lines 5—5 of FIG. 4.

The slots 14 and 16 have inlet end portions 58 (FIG. 5) which are preferably contoured to guide and facilitate airflow 44 movement into the slots 14 and 16, and the inlet end portions 58 are also oriented generally radially to the axis 52 for the same purpose. The slots 14 and 16 are preferably also curved generally downwardly from inlet end portion 58 to outlet end portion 56 in cross-section, with the outlet end portions 56 oriented generally tangentially to the outer surface 68 of the tailboom 12, as shown in FIG. 5. This curvature guides the airflow 44 through the slots 14 and 16 so that it exits in a direction generally tangential to the outer surface 68 of the tailboom 12. In addition, the slots 14 and 16 are preferably positioned so that they are generally perpendicular to the direction of movement of the downwash 54 and generally parallel to the direction of airflow 44 into the cavity 30 as well as generally parallel to the axis 52. Consequently, the positioning and curvature of the slots 14 and 16, in conjunction with the unique ramp structures 22 and 24 and fence structures 32 and 34, and orientations thereof, provide an airflow 44 exiting the slots 14 and 16 in generally the same direction as the downwash 54 passing over the slots 14 and 16. This enables the airflow 44 to be more effective in deflecting the downwash 54 to thereby increase the lateral force (or lift) acting on the tailboom 12. Alternatively, instead of being utilized to deflect the main rotor downwash 54, the airflow (or fluid flow) 44 provided by the system 10 may be utilized to deflect any other type of suitable airstream or fluid stream to provide the desired force generation.

The fences 32 and 34 are positioned generally within the slots 14 and 16 between the outlet end portions 56 and the inlet end portions 58, as shown in FIG 5. The fences 32 and 34 are preferably approximately one-half inch from the inlet end portions 58 and one inch from the outlet end portions 56. The fences 32 and 34 also generally conform to the cross-sectional shape of the slots 14 and 16. The upper and lower ends 60 and 62 (FIG. 6) of the fences 32 and 34 are preferably in full contact with the upper and lower surfaces 64 and 66 of the slots 14 and 16, so that the airflow moving in a generally axial direction cannot pass through or leak between the upper or lower ends 60 and 62 of the fences 32 and 34 and the slots 14 and 16. In addition, the fences 32 and 34 of each set are preferably spaced apart from each other a distance of approximately six inches in order to maximize their desired effect of preventing axial movement of the airflow 44 at the slots 14 and 16.

The ramps 22 and 24, the slots 14 and 16, and the fences 32 and 34 are preferably composed of a rigid lightweight material such as aluminum or composite graphite. However, they may also be composed of other suitable types of material that have sufficient rigidity to perform the blocking and deflecting functions described hereinabove while adding minimal weight to the control system.

Accordingly, there has been provided, in accordance with the invention, an airflow control system which is more effective and efficient in increasing and adjusting the force acting on a circulation control surface such as the helicopter tailboom herein described, and that fully satisfies the objectives set forth above. It is to be understood that all the terms used herein are descriptive rather than limiting. Although the invention has been described in conjunction with the specific embodiment set forth above with regard to helicopters, the invention may also be utilized with both rotor and fixed wing aircraft, lighter than air vessels, boats or any other suitable vessel that may benefit from airflow or fluid flow control to increase lift or system controllability. Thus, many alternative embodiments, modifications and variations will be apparent to those skilled in the art in light of the disclosure set forth herein. Accordingly, it is intended to include all such alternatives, modifications, and variations that fall within the spirit and scope of the invention as set forth in the claims hereinbelow.

What is claimed is:

1. A helicopter antitorque control system comprising:
    a fuselage tailboom having a forward end, an aft end, an axis, and an exterior surface enclosing a cavity;
    a main rotor mounted above said tailboom, and being adapted to rotate about an axis generally normal to said tailboom axis for creating a downwash, the downwash from said rotating rotor flowing about said tailboom exterior surface;
    a fan located in a forward portion of said tailboom for producing an airflow through said tailboom cavity in a fore to aft direction;
    a slot located in said exterior surface and oriented generally along the tailboom axis, said slot being adapted to permit the airflow to exit from said cavity into the main rotor downwash flowing about said exterior surface; and
    a fence located in said slot, said fence including a substantially flat surface extending into the airflow and oriented such that the flat surface is generally perpendicular to the airflow for slowing the airflow travelling down the cavity adjacent to the slot and causing the airflow to exit the cavity through said slot in a direction generally normal to said tailboom axis.

2. A helicopter antitorque control system as recited in claim 1, and further comprising a plurality of fences axially spaced along said slot.

3. A helicopter antitorque control system as recited in claim 2, wherein said plurality of fences are axially spaced approximately 6 inches apart.

4. A helicopter antitorque control system as recited in claim 1, and further comprising a ramp located within said cavity forwardly of said slot for directing the airflow towards the tailboom axis and away from the slot.

5. A helicopter antitorque control system as recited in claim 1, and further comprising a jet thruster aperture for discharging the airflow from within the tailboom, said aperture being located in the tailboom aft of the slot.

6. A helicopter antitorque control system comprising:
    a fuselage tailboom having a forward end, an aft end, an axis, and an exterior surface enclosing a cavity;
    a main rotor mounted above said tailboom, and being adapted to rotate about an axis generally normal to said tailboom axis for creating a downwash, the downwash from said rotating rotor flowing about said tailboom exterior surface;
    a fan located in a forward portion of said tailboom for producing an airflow through said tailboom cavity in a fore to aft direction;
    a slot located in said exterior surface and oriented generally along the tailboom axis, said slot being adapted to permit the airflow to exit from said cavity into the main rotor downwash flowing about said exterior surface; and
    a ramp located within said cavity forwardly of said slot, said ramp comprising an upstream end, a downstream end and an inwardly sloping surface for directing the airflow within said cavity towards the axis of the tailboom and away from the slot, wherein the ramp upstream end is located farther outwardly of said axis with respect to the ramp downstream end, said ramp being located within said cavity forwardly of said slot for directing the airflow towards the axis of the tailboom and away from the slot.

7. A helicopter antitorque control system as recited in claim 6, and further comprising a fence located in said slot, said fence having a substantially flat surface extending into the airflow and oriented such that the flat surface is generally perpendicular to the airflow for slowing the airflow travelling down the cavity adjacent to the slot and causing the airflow to exit the cavity through said slot in a direction generally normal to said tailboom axis, the ramp downstream end being located upstream of said fence.

8. A helicopter antitorque control system as recited in claim 7, wherein the ramp downstream end is located approximately 4 inches upstream of said fence.

9. A helicopter antitorque control system as recited in claim 6, and further comprising a second slot located on said exterior surface, an a second ramp located within said cavity forwardly of said second slot.

10. A helicopter antitorque control system as recited in claim 9, and further comprising a fence located in each slot which is adapted to cause air to exit the cavity through each of said slots in a direction generally normal to said axis.

11. A helicopter antitorque control system as recited in claim 6, and further comprising a jet thruster aperture for discharging the airflow from within the tailboom, said aperture being located in the tailboom aft of the slot.

12. A helicopter antitorque control system comprising:

a fuselage tailboom having a forward end, an aft end, an axis, and an exterior surface enclosing a cavity;

a main rotor mounted above said tailboom, and being adapted to rotate about an axis generally normal to said tailboom axis for creating a downwash, the downwash flowing about said tailboom exterior surface;

a fan located in a forward portion of said tailboom for producing an airflow through said tailboom cavity in a fore to aft direction;

a slot located in said exterior surface and oriented generally perpendicular to the direction of flow of the downwash and generally parallel to the direction of the airflow within the cavity, said slot being adapted to permit the airflow to exit from said cavity into the rotor downwash flowing about said exterior surface;

a ramp located within said cavity forwardly of said slot for directing the airflow into the center of the cavity towards the axis of the tailboom and away from the slot; and a plurality of fence members having substantially flat surfaces located in said slot and being oriented such that the flat surface is generally perpendicular to the airflow for slowing the airflow along the tailboom axis adjacent to the slot.

13. A helicopter antitorque control system as recited in claim 12, and further comprising a plurality of slots, each slot being configured with a forwardly located ramp and internal fence members.

14. A helicopter antitorque control system as recited in claim 12, wherein the slot further comprises an inlet end portion and an outlet end portion which are contoured to guide and facilitate the airflow movement into the slots and out of the slots in a direction tangential to the outer surface of the tailboom at the slot.

15. A helicopter antitorque control system as recited in claim 14, wherein the fence members are positioned within the slot between the outlet end portion and the inlet end portion.

16. A helicopter antitorque control system as recited in claim 12, wherein the fence members and the ramp comprise a lightweight rigid material.

17. A helicopter antitorque control system as recited in claim 12, wherein the fence members and the ramp comprise aluminum.

18. A helicopter antitorque control system as recited in claim 12, and further comprising a jet thruster aperture for discharging airflow from within the tailboom, said aperture being located in the tailboom aft of the slot.

* * * * *